United States Patent
Euler et al.

(10) Patent No.: US 6,850,315 B1
(45) Date of Patent: Feb. 1, 2005

(54) INTENSITY-BASED OPTICAL WAVEGUIDE SENSOR

(75) Inventors: William B. Euler, Narragansett, RI (US); Otto J. Gregory, Wakefield, RI (US); Gregg S. Huston, Wakefield, RI (US)

(73) Assignee: The Board of Governors for Higher Education State of Rhode Island and Providence Plantations, Providence, RI (US)

( * ) Notice: Subject to any disclaimer, the term of this patent is extended or adjusted under 35 U.S.C. 154(b) by 0 days.

(21) Appl. No.: 09/762,863
(22) PCT Filed: Aug. 25, 1999
(86) PCT No.: PCT/US99/19601

§ 371 (c)(1),
(2), (4) Date: May 2, 2001

(87) PCT Pub. No.: WO00/12960
PCT Pub. Date: Mar. 9, 2000

(Under 37 CFR 1.47)

Related U.S. Application Data
(60) Provisional application No. 60/097,989, filed on Aug. 26, 1998.

(51) Int. Cl.$^7$ .................................................. G01B 9/02
(52) U.S. Cl. ........................................ 356/35.5; 73/800
(58) Field of Search ........................ 356/32, 35.5, 480, 356/477, 519; 73/800

(56) References Cited

U.S. PATENT DOCUMENTS

| | | |
|---|---|---|
| 4,756,606 A | 7/1988 | Jewell et al. |
| 4,781,056 A | 11/1988 | Noel et al. |
| 4,937,134 A * | 6/1990 | Schrenk et al. ............. 428/213 |
| 5,094,517 A | 3/1992 | Franke |
| 5,120,966 A | 6/1992 | Kondo |
| 6,281,976 B1 | 8/2001 | Taylor et al. |

* cited by examiner

Primary Examiner—Zandra V. Smith
Assistant Examiner—Andrew H. Lee
(74) Attorney, Agent, or Firm—Gauthier & Connors LLP

(57) ABSTRACT

The invention relates to polymeric/semiconductor thin film strain gauges comprising visible light from spectrometer (10) which is directed onto a thin film passive sensor (12) having a transparent glass substrate (14) and a laminated construction in succession from the substrate (14), of a polyimide layer (18a) a polysiloxane layer (16a) filled with alumina particles, a polyimide layer (18b) and a polysiloxane layer (16b) filled with alumina particles.

14 Claims, 5 Drawing Sheets

INTENSITY-BASED OPTICAL WAVEGUIDE SENSOR

This application, which is a National Stage of International Application No. PCT/US99/19601, filed on Aug. 25, 1999, claims priority to U.S. Provisional Application No. 60/097,989, filed on Aug. 26, 1998.

BACKGROUND OF THE INVENTION

1. Field of the Invention

The invention relates to polymeric/semiconductor thin film strain gauges

2. Description of the Relevant Art

Many civil engineering structures display fatigue, and occasionally failure, after years of exposure to natural forces. In other instances, the failure is a result of a catastrophic event, such as an earthquake, tornado, or hurricane. There is a need for an inexpensive, robust, and sensitive strain gage that is unaffected by seasonal environmental variations. Further, such a sensor should be simple, easily installed, and readily integrated into modern data communication systems.

The sensor system disclosed herein can monitor the integrity of structures for the purpose of public safety and maintenance. Specific applications include building, road, and bridge integrity. The system employs, as the sensing component, multiple optical strain gages that are inexpensive, inert to natural environments, and physically robust. Combined with an automated data collection and diagnostic analysis programming, such sensors and their optical fiber data links can be placed on the superstructures and footings of bridges, in the support components of buildings, or embedded into the surfaces of roads and pedestrian skywalks. The 'health' of such structures and surfaces can be automatically monitored and assessed with a minimum of human time allocation. Detailed use information would also be valuable in assessing the need for routine maintenance or for the need for repair after a potential catastrophic loading.

SUMMARY OF THE INVENTION

The sensitivity and the passivity behavior of the sensors distinguishes from the prior art. Current resistive strain sensors have gage factors (the measure of sensitivity) of about 2–3. The disclosed sensors have gage factors on the order of 200–800. It is not believed the prior art discloses any passive sensors that have a memory that does not rely on a power source.

Thin films of semiconductors or polymers are used to measure strain. The thin films are layered with each layer consisting of materials with different refractive indices. Because each layer has a different refractive index, light that is introduced into the composite structure can either be reflected or pass through at each interface. This allows interference of the incident light that passes through with light that is reflected resulting in a measurable absorption change. The degree of interference is sensitive to the refractive index and thickness of each layer. The thickness of the each layer changes with application of an external stress. The consequence of this is that the light absorption changes as a function of strain so that the absorption change can be used to measure the strain.

There are two types of interferometric sensors disclosed herein, active and passive. An active sensor responds to the strain reversibly, i.e. as the strain changes the absorption changes in a reversible and predictable fashion. This type of sensor is used to measure the existing strain on a structure.

A passive sensor has a memory of the maximum strain experienced by the structure. For example, if a structure experiences a large deformation (a large strain) but then relaxes to a small rest value, the large deformation is not reversible. An active sensor will measure the stain events only if continuously monitored while the passive sensor will measure only the maximum strain experienced. If the active sensor is not being monitored while the maximum strain is occurring, the large strain excursion will not be observed. The passive sensor overcomes this problem.

Broadly the invention comprises both active and passive sensors which preferably are used in the same structure. Both sensors are constructed by layering materials, either semiconductors or polymers having different refractive indices. The sensitivity is increased when the difference in refractive index is maximize and also as the number of layers is increased. The passive sensors are constructed by adding small particulates to one set of layers.

DESCRIPTION OF THE PREFERRED EMBODIMENT(S)

Incident light can be measured in reflectance or transmission to determine the strain.

Figure 1:
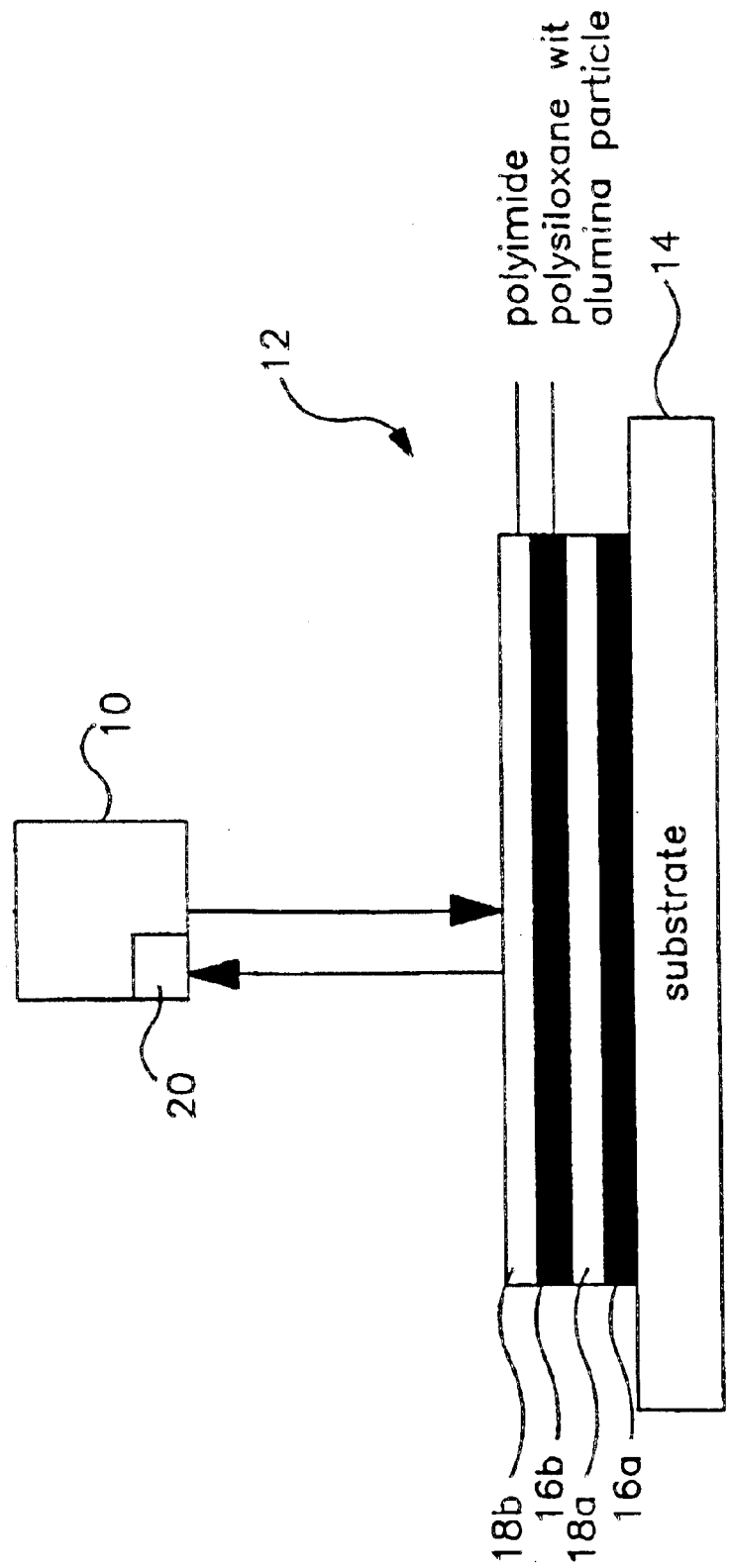
FIG. 1 is an illustration of a passive sensor.

Referring to FIG. 1, reflectance mode, visible light from a spectrometer 10, such as Perkin Elmer Lambda 2, is directed onto a thin film passive sensor shown generally at 12. The sensor 12 comprises a transparent glass substrate 14 and a laminated construction in succession from the substrate 14, of a polyimide layer 18a, a polysiloxane layer 16a filled with alumina particles, a polyimide layer 18b and a polysiloxane layer 16b filled with alumina particles. The incident light beam is normal to the sensor surface. The light is collected along the incidence beam path in a photomultiplier tube detector 20 in the spectrometer 10. The layers can range in thickness from 1–20 microns. The passive sensor is prepared by mixing 50 nm particles of aluminum oxide in with the polysiloxane layer in an amount of 0.5 to 10% by weight based on the total weight of the polysiloxane layer. During preparation, the small particles aggregate to some (currently unknown) degree. Under strain, some of the particles in the aggregate separate and the polymer fills in between the newly separated alumina particles. When the strain is removed, the particles cannot reaggregate because of the intervening polymer. This is detected optically because the size of the aggregates determines the amount of light scattered off of the sample: as the aggregate size changes because of the strain, the amount of light directed toward the detector changes since the detector only samples a small volume of space. The passive sensor requires no power to achieve its memory effect.

Figure 2A:
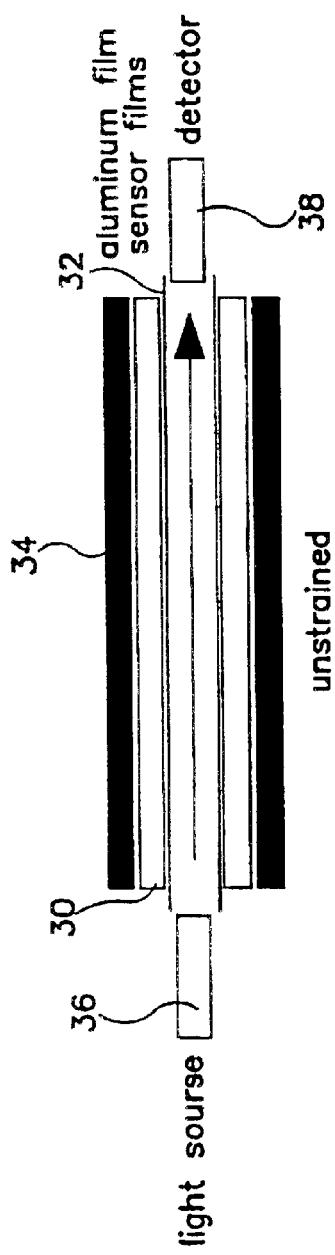
FIGS. 2a and 2b are illustrations of an alternative embodiment of FIG. 1.

Referring to FIG. 2a, the transmission mode, for an active sensor a capillary tube 30, e.g. i.d. 0.5 mm; o.d 0.7 mm, is used as a light conduit. Thin films 32, e.g. polysiloxane/polyimide, are deposited onto the outside walls of the capillary tube 30 and then these films are coated with aluminum 34. The aluminum 34 serves as a mirror to keep all the light confined in the tube 30 and to protect the entire structure from the surrounding environment. A fiber optic source 36 inputs light in a wavelength range of 500 to 1,000

Angstroms into one end of the capillary tube 30 parallel to the longitudinal axis of the tube and a detector 38 collects the light at the other end.

Figure 2B:
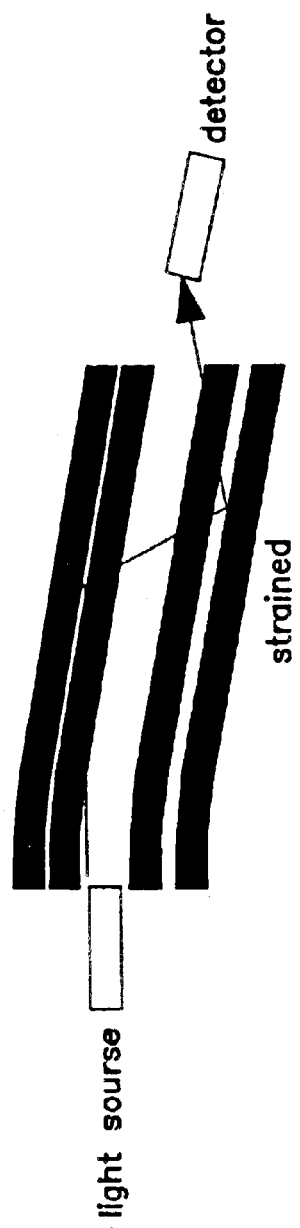

In the capillary configuration, the tube 30 acts as both a waveguide and a sensor. Under no strain, most of the light passes down the tube without interacting with the walls. With application of a strain the capillary tube 30 bends, FIG. 2b, so that a significant amount of light is introduced into the thin film coatings along the tube walls. Two effects cause a modulation of the output light intensity. First, the path length is changed so any absorption that occurs is increased, depending upon the absorptivity of the wall materials and the number of bounces the light undergoes. Second, the interference effect observed as light passes through the thin film layers still is operative, also causing intensity modulation by constructive or destructive interference, depending on the refractive index and thickness of each layer and the wavelength of light used.

The film thicknesses 32 are on the order of 1 to 20 microns, thinner being a bit better. The wavelengths of maximum response depends upon the layer thicknesses, but that wavelength can be chosen arbitrarily to match the thin film structure. The aluminum coating has a thickness of between 400 to 800 nm.

The alternating layers must have a different refractive index and the larger the difference, the better the sensor response. Polyimide has n=1.6–1.7 (depending upon the exact polyimide used, the nature of the curing, and the supplier); polysiloxane has n=1.44. Other commonly available transparent polymers polyethylene, polypropylene, Teflon®, polyvylidene flouride, polyester, etc. have refractive indices around 1.4 and could substitute for the polysiloxane layer. High refractive index polymers such as polycarbonates have refractive indices approximately the same as polyimide.

A preferred sensor system requires both a passive and an active sensor in close proximity. The passive sensor measures the maximum strain excursion experienced but not a temporal history, i.e. the measured strain may be current or previous. Thus, the role of the active sensor is to measure the existing strain at the time of measurement.

The sensors can be applied to a structure by currently known bonding techniques used for the current generation of strain sensors. Because the sensors are small, they will measure the strain of the substrate material reliably. The optical source and detector need not be embedded with the sensor. With the appropriate fiber optic connections, the optical measurement can be made periodically by connecting a handheld spectrometer to the input and output of the sensor. Thus, for example, after an earthquake the maximum strain experienced by each structural element in a building could be determined well after the event (days or weeks) to establish the safety of the building since the passive sensor retains this information even with (the likely) loss of power. Alternatively, a fiber optic network connected to each sensor in a building that remotely senses the strain automatically. However, during a catastrophic event the fiber network is likely to break and prevent this mode of operation.

The materials used in the sensor are both inexpensive and robust. For example, the polysiloxane is a commercially available gasket sealer. The capillary configuration is especially attractive for long term applications because, if necessary, the entire sensor can be enclosed. Then, for example, if the sensor is to be used in a harsh environment such as a bridge, the entire sensor can be isolated from wind, rain, salt spray, etc. because any coatings applied outside of the aluminum layer have no affect on the sensor performance.

EXAMPLES

Figure 3:
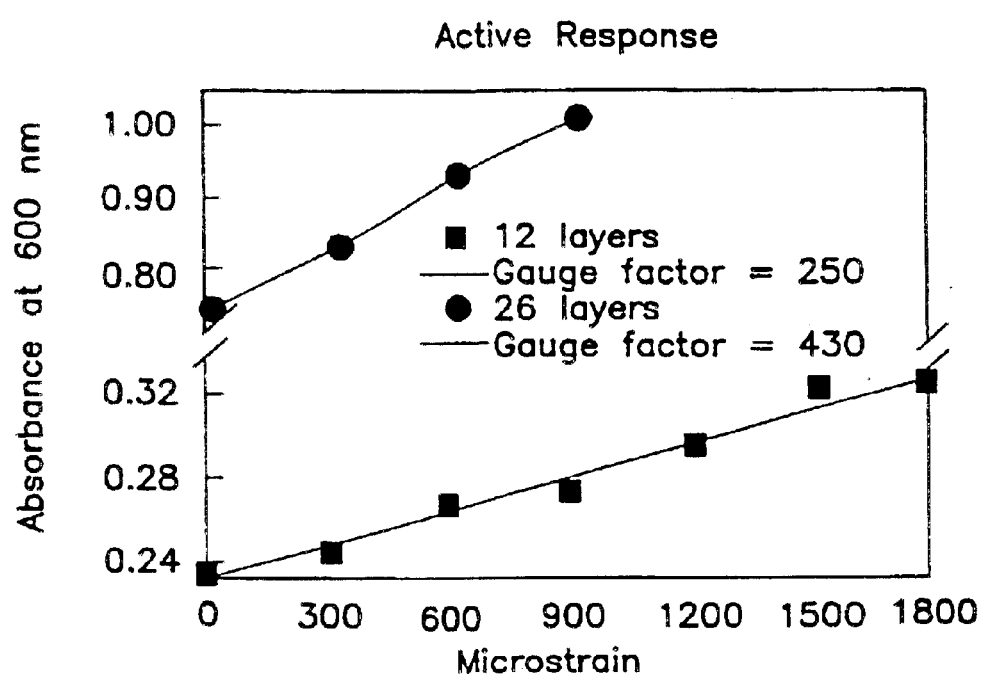
FIG. 3 is a graph of the optical response of an active sensor.
Figure 4:
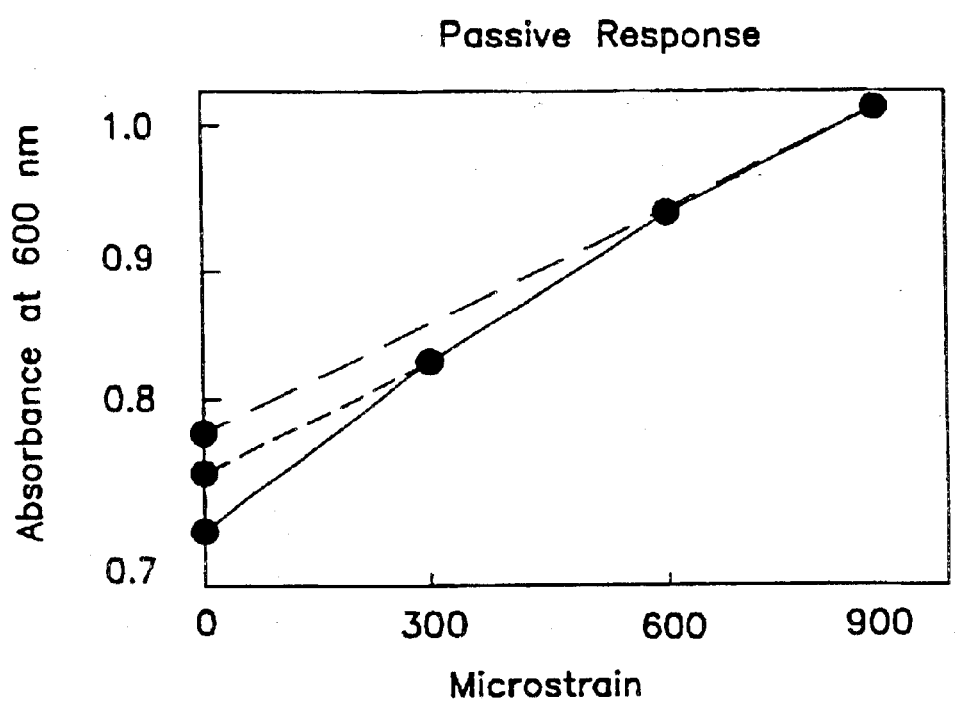
FIG. 4 is a graph of the optical response of an passive sensor.
Figure 5:
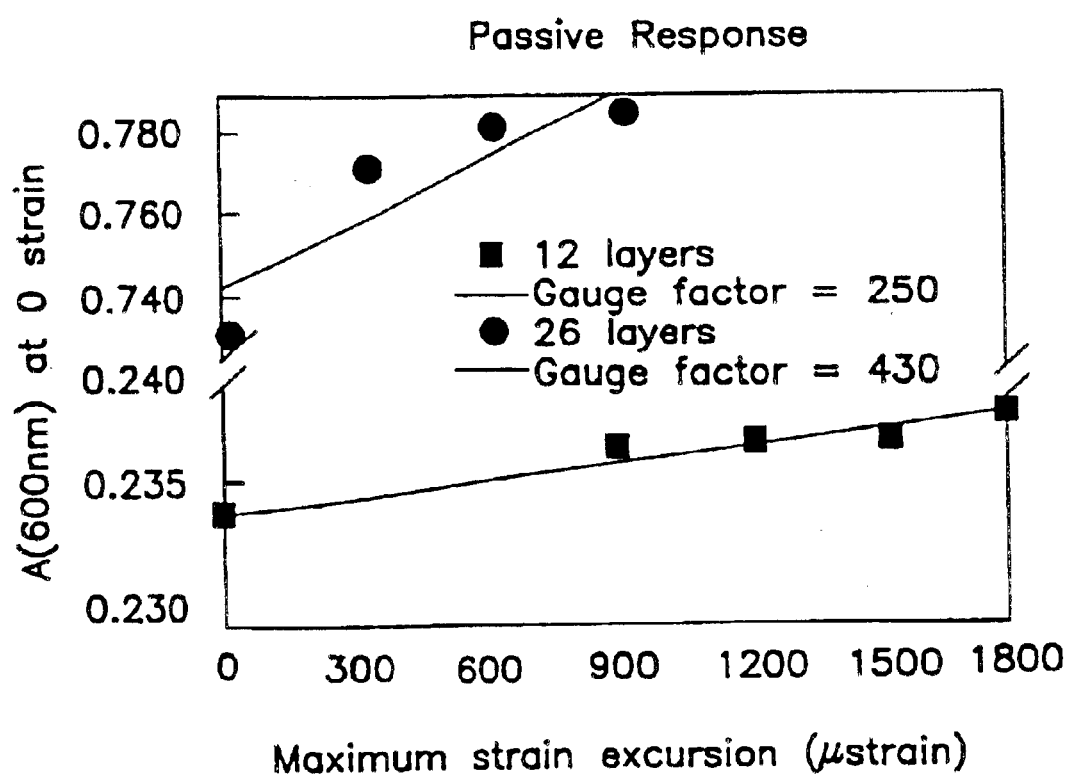
FIG. 5 is a graph of the optical response of a passive sensor.

Examples of the sensor a response are given in FIGS. 3, 4 and 5. The light source was a tungsten lamp, and strain was applied by four point bending, see ASTM C-1341-97.

FIG. 3 shows the response of two different active strain sensors, one with 12 layers (6 alternating layers of polysiloxane and polyimide) and one with 26 alternating layers. Layer thickness was about 10 microns. The absorbance was monitored at 600 nm as a function of applied strain with the results shown. The gage factor is a function of the number of layers indicating the interferometric nature of the response. Further, the gage factors are large, more than two orders of magnitude larger than found in typical resistance strain gages. Finally, the response is linear and reversible over the entire range up to about 2000 μstrain (this is the typical limit required for structural applications since most materials exceed their plastic deformation limits at about 2000 μstrain).

FIG. 4 shows the response of a passive strain gage having 26 alternating layers. The layer thickness was about 10 microns. As strain is applied, the response is similar to an active gage. The absorbance was monitored at 600 nm. However, when the strain is released the response is no longer reversible, i.e., the 0-stain absorbance depends upon the history of the sample. This is demonstrated in FIG. 4 for several different strain excursions. The virgin gage has an absorbance value at 600 nm of A=0.73. Application of 300 μstrain changes this to A=0.83. Upon release of the stress back to 0 μstrain the absorbance returns to A=0.78, shown as the short dashed line in FIG. 4. Application of any strain less than 300 μstrain follows the dashed line path reversibly. However, if the strain exceeds 300 μstrain, then the path reverts to the solid line as shown for the 600 μstrain point in FIG. 4. Now when the stress is released, a new path is taken, shown as the dotted line, and to a new absorbance at 0 μstrain.

The increments between successive strain excursions decreases with increasing strain (i.e., the passive response is nonlinear) and this is demonstrated in FIG. 5. The 12 layer gage has a small gage factor but a larger, nearly linear response range. The 26 layer gage has a larger gage factor but becomes clearly nonlinear at significantly smaller maximum strains.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described our invention what we now claim is:

1. An interferometric strain gage sensor which comprises:
   a support;
   a first layer of polymeric material having a first refractive index;
   a second layer of polymeric material having a second refractive index which second refractive index is distinct from the first refractive index, the sensor having a gage factor of at least 100 and light energy communicates with the sensor, when a strain is applied to the sensor, the light energy is partly absorbed and the change in light energy correlates to the strain applied, the sensor being passive and one of said layers being filled with particulate.

2. The sensor of claim 1 which comprises:
   a plurality of alternating first and second layers.

3. The sensor of claim 2 wherein the first layer has a refractive index of approximately 1.6 to 1.7 and is selected from the group consisting of polyimides and polycarbonates.

4. The sensor of claim 3 wherein the first layer is polyimide.

5. The sensor of claim 2 wherein the second layer has a refractive index of about 1.4 and is selected from the group consisting of polysiloxane, polyethylene, polypropylene, Teflon®, polyvinylidene fluoride and polyester.

7. The sensor of claim 5 wherein the second layer is polysiloxane.

7. The sensor of claim 4 or 6 wherein the thicknesses of the layers are between about 1 to 20 microns.

8. The sensor of claim 1 wherein there are multiple first and second layers in alternating relationship, the first layer selected from the group consisting of polyimides and polycarbonates, the second layer selected from the group consisting of polysiloxane, polyethylene, polypropylene, Teflon®, polyvinylidene fluoride and polyester.

9. The sensor of claim 8 wherein the first layer is polyimide and the second layer is polysiloxane filled with aluminum oxide particulate.

10. The sensor of claim 1 which comprises:

means for contacting the sensor with light energy; and means for measuring changes in the light energy.

11. An interferometric strain gage sensor which comprises:

a first layer of polymeric material having a first refractive index;

a second layer of polymeric material having a second refractive index which second refractive index is distinct from the first refractive index, the sensor having a gage factor of at least 100 and light energy communicates with the sensor, when a strain is applied to the sensor, the light energy is partly absorbed and the change in light energy correlates to the strain applied, the sensor being an active strain gage and further comprising a tube-like support for the first and second layers.

12. The sensor of claim 11 wherein the first layer has a refractive index of approximately 1.6 to 1.7 and is selected from the group consisting of polyimides and polycarbonates, and wherein the second layer has a refractive index of about 1.4 and is selected from the group consisting of polysiloxane, polyethylene, polypropylene, Teflon®, polyvinylidene fluoride and polyester.

13. The sensor of claim 12 which further comprises a third layer comprised of aluminum.

14. The sensor of claim 13 which comprises:

means for contacting the sensor with light energy; and means for measuring changes in the light energy.

\* \* \* \* \*

UNITED STATES PATENT AND TRADEMARK OFFICE
CERTIFICATE OF CORRECTION

PATENT NO. : 6,850,315 B1
DATED : February 1, 2005
INVENTOR(S) : Euler et al.

It is certified that error appears in the above-identified patent and that said Letters Patent is hereby corrected as shown below:

<u>Column 1,</u>
Line 4, add to:
-- SPONSORSHIP INFORMATION
This invention was made with government support under Grant Number 9627265, awarded by NSF. The government has certain rights in the invention. --.

Signed and Sealed this

Sixth Day of December, 2005

JON W. DUDAS
*Director of the United States Patent and Trademark Office*